United States Patent
Li et al.

(10) Patent No.: US 12,045,235 B2
(45) Date of Patent: Jul. 23, 2024

(54) ACCESS PATH FOR DATABASE OPTIMIZER

(71) Applicant: International Business Machines Corporation, Armonk, NY (US)

(72) Inventors: Shuo Li, Beijing (CN); Xiaobo Wang, Beijing (CN); Sheng Yan Sun, Beijing (CN); Hong Mei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 17/121,367

(22) Filed: Dec. 14, 2020

(65) Prior Publication Data

US 2022/0188314 A1 Jun. 16, 2022

(51) Int. Cl.
*G06F 16/2453* (2019.01)
*G06F 11/34* (2006.01)
*G06F 16/21* (2019.01)

(52) U.S. Cl.
CPC .... *G06F 16/24544* (2019.01); *G06F 11/3419* (2013.01); *G06F 16/217* (2019.01)

(58) Field of Classification Search
CPC ............. G06F 16/24544; G06F 16/217; G06F 16/2282
See application file for complete search history.

(56) References Cited

U.S. PATENT DOCUMENTS

| | | | |
|---|---|---|---|
| 6,006,220 A * | 12/1999 | Haderle | G06F 16/24549 |
| 6,219,660 B1 | 4/2001 | Haderle et al. | |
| 8,990,783 B1 * | 3/2015 | Yu | G06F 8/35 |
| | | | 703/22 |
| 9,436,735 B1 * | 9/2016 | Feng | G06F 16/24545 |
| 10,469,346 B2 * | 11/2019 | Maroulis | G06F 11/3433 |
| 10,515,078 B2 * | 12/2019 | Shimizu | G06F 16/21 |
| 10,691,691 B2 * | 6/2020 | Goergens | G06F 9/3013 |
| 11,076,023 B1 * | 7/2021 | Ganapathi | H04L 41/145 |
| 11,176,128 B2 * | 11/2021 | Wang | G06N 20/00 |
| 2001/0037473 A1 * | 11/2001 | Matsuura | G06F 11/2025 |
| | | | 714/E11.073 |
| 2002/0010701 A1 * | 1/2002 | Kosciuszko | G06F 16/22 |
| 2002/0026434 A1 * | 2/2002 | Krebs | G06Q 10/10 |
| 2002/0055937 A1 * | 5/2002 | Walther | G06Q 10/10 |
| 2004/0093332 A1 | 5/2004 | Hrle | |

(Continued)

OTHER PUBLICATIONS

"Reusing and comparing access paths at bind and rebind", IBM, Sep. 9, 2020, 6 pages, <https://www.ibm.com/support/knowledgecenter/SSEPEK_10.0.0/perf/src/tpc/db2z_reusecompareaccesspaths.html>.

(Continued)

*Primary Examiner* — Vaishali Shah
(74) *Attorney, Agent, or Firm* — Gavin Giraud

(57) ABSTRACT

In a computer-implemented method for improving performance of a database optimizer, a processor calculates a first execution time for a database query executing through a first access path of a database system. A processor generates a second access path. A processor determines a second execution time via a simulation of the database query through the second access path. A processor determines that the second execution time is less than the first execution time. A processor, responsive to determining that the second execution time is less than the first execution time, sends the second access path to the database optimizer.

16 Claims, 6 Drawing Sheets

(56) References Cited

U.S. PATENT DOCUMENTS

| | | | |
|---|---|---|---|
| 2004/0225865 A1* | 11/2004 | Cox | G06F 16/2455 712/34 |
| 2005/0091196 A1* | 4/2005 | Day | G06F 16/24542 |
| 2007/0050328 A1* | 3/2007 | Li | G06F 16/9032 |
| 2007/0168324 A1* | 7/2007 | Grabs | G06F 16/24542 |
| 2008/0126069 A1* | 5/2008 | Tyborowski | G06F 30/20 703/21 |
| 2009/0083110 A1* | 3/2009 | Markovic | G06Q 10/06 705/7.26 |
| 2009/0112793 A1* | 4/2009 | Ahmed | G06F 16/2456 707/E17.054 |
| 2010/0094835 A1* | 4/2010 | Lu | G06F 16/951 707/E17.143 |
| 2010/0114865 A1* | 5/2010 | Gupta | G06F 16/217 707/E17.017 |
| 2010/0191706 A1* | 7/2010 | Newport | G06F 9/466 707/648 |
| 2011/0004878 A1* | 1/2011 | Divoux | G06F 9/4856 718/1 |
| 2011/0264805 A1* | 10/2011 | Breitgand | G06F 9/45558 709/226 |
| 2012/0095804 A1* | 4/2012 | Calabrese | G06Q 10/105 705/7.31 |
| 2013/0138630 A1* | 5/2013 | Yang | G06F 16/2453 707/716 |
| 2015/0310643 A1* | 10/2015 | Rzeszotarski | G06T 13/20 345/441 |
| 2016/0253379 A1* | 9/2016 | Ford | G06F 11/362 707/721 |
| 2017/0124134 A1 | 5/2017 | Wei et al. | |
| 2018/0247247 A1* | 8/2018 | Xu | G06Q 10/06393 |
| 2019/0079973 A1 | 3/2019 | Wang et al. | |
| 2019/0332376 A1* | 10/2019 | Borra | G06F 11/3442 |

OTHER PUBLICATIONS

"Using EXPLAIN to understand the access path", IBM, Printed Sep. 23, 2020, 4 pages, <https://www.ibm.com/support/knowledgecenter/en/SSEPEK_12.0.0/intro/src/tpc/db2z_explainforunderstandingaccesspath.html>.

* cited by examiner

ACCESS PATH FOR DATABASE OPTIMIZER

BACKGROUND

The present invention relates generally to the field of database optimization, and more particularly to generating additional and alternative access paths to optimize retrieval of data within a database.

In certain database types, a database system chooses an "access path" to retrieve data after a database query (e.g., structured query language (SQL) request) is executed. The database system receives a database query that, for example, requests at least one variable to be filled up with one or more values. The variable may include a few thousand rows/cells from among tens of thousands of rows/cells within the database (i.e., a database table). The database system estimates a filter factor using the determined value for the variable, and selects an access path to retrieve the data.

The database system can hamper the overall performance of the system by selecting an inefficient or resource-intensive access path. A complex query may require the database system to search for many variables that can be matched to many different records on separate tables. Some of these variables may increase complexity by including conditions such as greater than or less than some value of integers within the query. Databases may use database optimizers that run algorithms to optimize selection of access paths while minimizing total access cost. Database optimizers gauge cost formulas by weighing input/output and CPU utilization, evaluating the available paths to data retrieval, and estimating the cost in executing the statements using the determined paths.

SUMMARY

Aspects of one embodiment of the present invention disclose a computer-implemented method, a computer program product, and a computer system for improving performance of a database optimizer. A processor calculates a first execution time for a database query executing through a first access path of a database system. A processor generates a second access path. A processor determines a second execution time via a simulation of the database query through the second access path. A processor determines that the second execution time is less than the first execution time. A processor, responsive to determining that the second execution time is less than the first execution time, sends the second access path to the database optimizer.

DETAILED DESCRIPTION

Access paths are generally set during binding, and selecting between the access paths requires assumptions that may become inaccurate as data is written to the database between data binding refreshes. To alleviate inefficient access path selection, embodiments disclosed herein utilize a performance simulation system that generates additional access paths that may be selected by a database optimizer. The database optimizer selects among access paths to provide an efficient and speedy execution of a database query. The performance simulation system also assists the optimizer in selecting between the generated access paths by comparing filter factor vectors.

Figure 1:
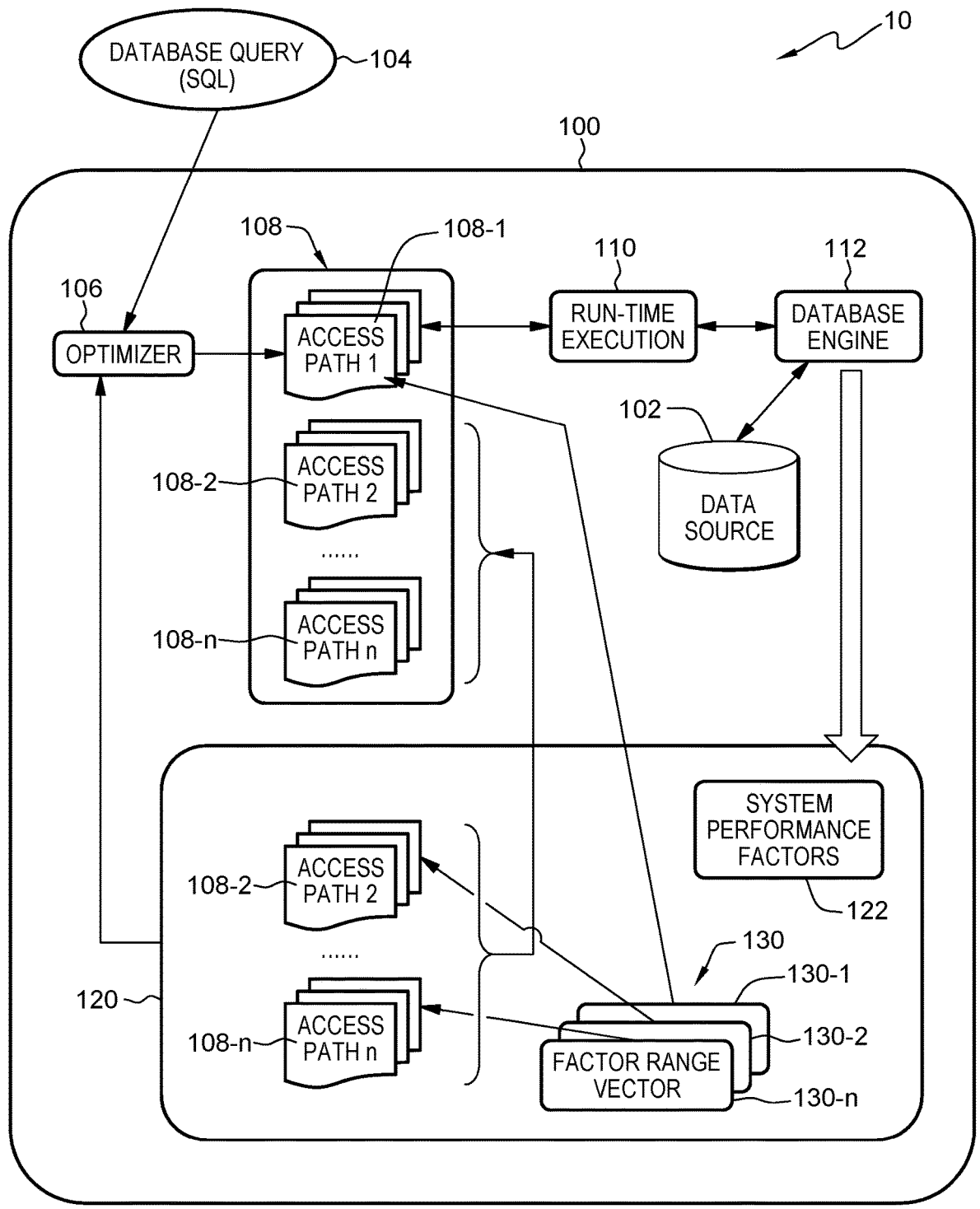
FIG. 1 depicts a functional block diagram illustrating a database system environment, in accordance with an embodiment of the present invention.

The present invention will now be described in detail with reference to the Figures. FIG. 1 depicts a functional block diagram illustrating a database system environment 10, in accordance with an embodiment of the present invention. The database system environment 10 includes a database system 100 that stores a data source 102, such as tables containing rows and columns of information, for future references by external users and applications. The database system 100 receives a database query 104 (e.g., predicate, structured query language (SQL) statement, request) from an external user or application, and the database system 100 accesses the data source 102 through the use of an optimizer 106, a run-time execution 110, and a database engine 112.

The optimizer 106 optimizes access to the data source 102 within the database system 100 according to locations of the data set forth during data binding. During data binding, the database system 100 connects stored data source 102 to the controls on a user interface. That is, data binding forms the link synchronizing the data source 102 and the data consumer, enabling two-way connection between visual elements and the data source 102. For example, the text property of a text box may be bound to a customer name or address fetched from the data source 102. Binding also may be applied to a graphic of an image control, background color of a control, or other property of a control on a form. The optimizer 106 optimizes access path selection by evaluating input/output and CPU utilization weight. In certain embodiments, the optimizer 106 evaluates access paths 108 to the data source 102 and estimates the cost in executing the statements using the determined paths or a combination of these paths. The access paths 108 are a technique used by a query to retrieve rows from a row source within the data source 102. In choosing the access path 108, the optimizer 106 examines a WHERE clause and a FROM clause in the database query 104. The optimizer 106 then lays out plans of execution using the determined access paths 108 and, with the use of statistics for the columns, index and tables accessible to the statement, the optimizer then estimates the cost of executing the plan. The access paths 108 may include options such as full table scan (i.e., the database system 100 scans all rows from the table and filters out those that do not match the criteria in the query), row ID scan, index scan (i.e., the database system 100 retrieves a row of records by traversing the index using the indexed column values required by the query statement), cluster access scan (i.e., the database system 100 retrieves all rows that have same cluster key value), and hash access scan (i.e., the database system 100 locates rows in a hush cluster basing on some hash value).

In certain embodiments, the database system 100 may also include a run-time execution 110 and a database engine 112 that supply real-time statistics to a performance simulation system 120. The performance simulation system 120 generates additional access paths 108 that the optimizer 106 may use to execute the database query 104.

Figure 2:
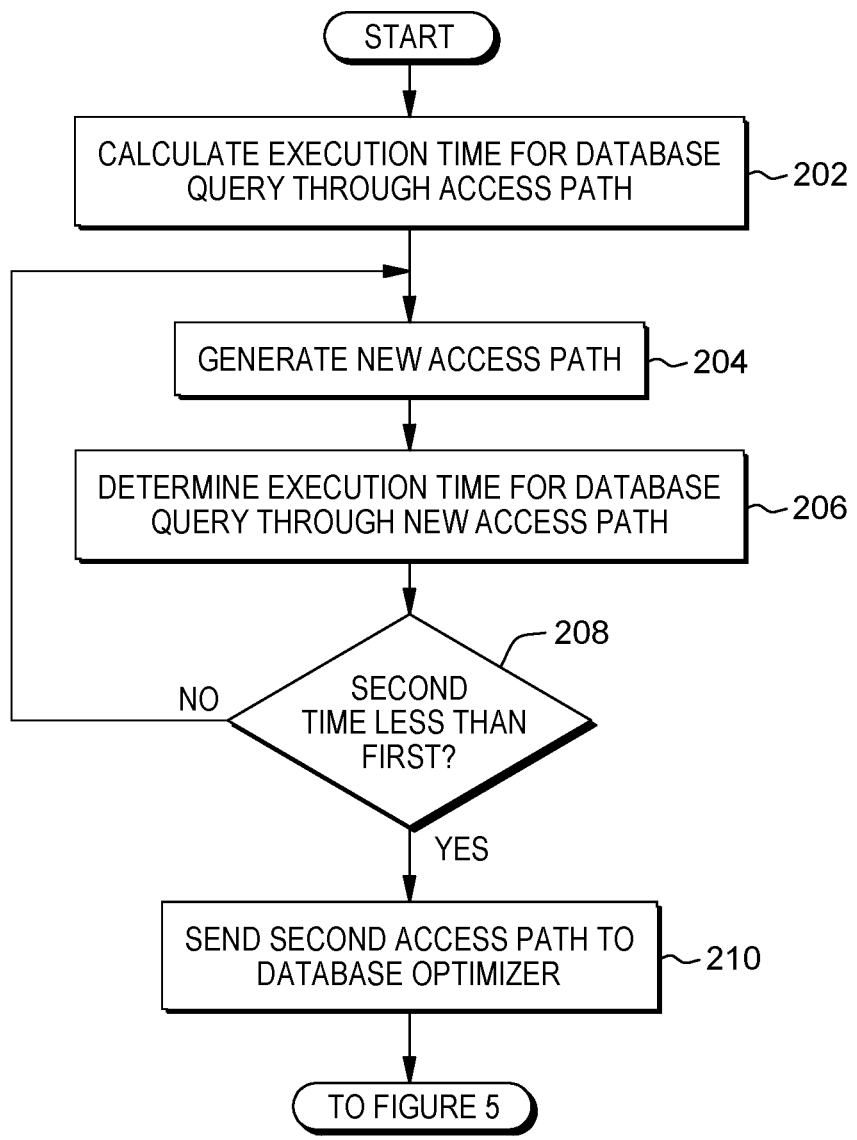
FIGS. 2 and 5 depict a flowchart showing operational procedures of a performance simulation system, in accordance with an embodiment of the present invention.

FIG. 2 depicts a flowchart showing operational procedures of the performance simulation system 120, in accordance with an embodiment of the present invention. The performance simulation system 120 calculates a first execution time for the database query 104 executing through the first access path 108-1 of the database system 100 (block 202). The first execution time may be calculated based on system performance factors 122 received from the database engine 112. For example, the performance simulation system 120 may collect real-time table cardinality, real-time column cardinality, filter factor, buffer pool hit ratio, prefetch efficiency as system performance factors 122.

Figure 3:
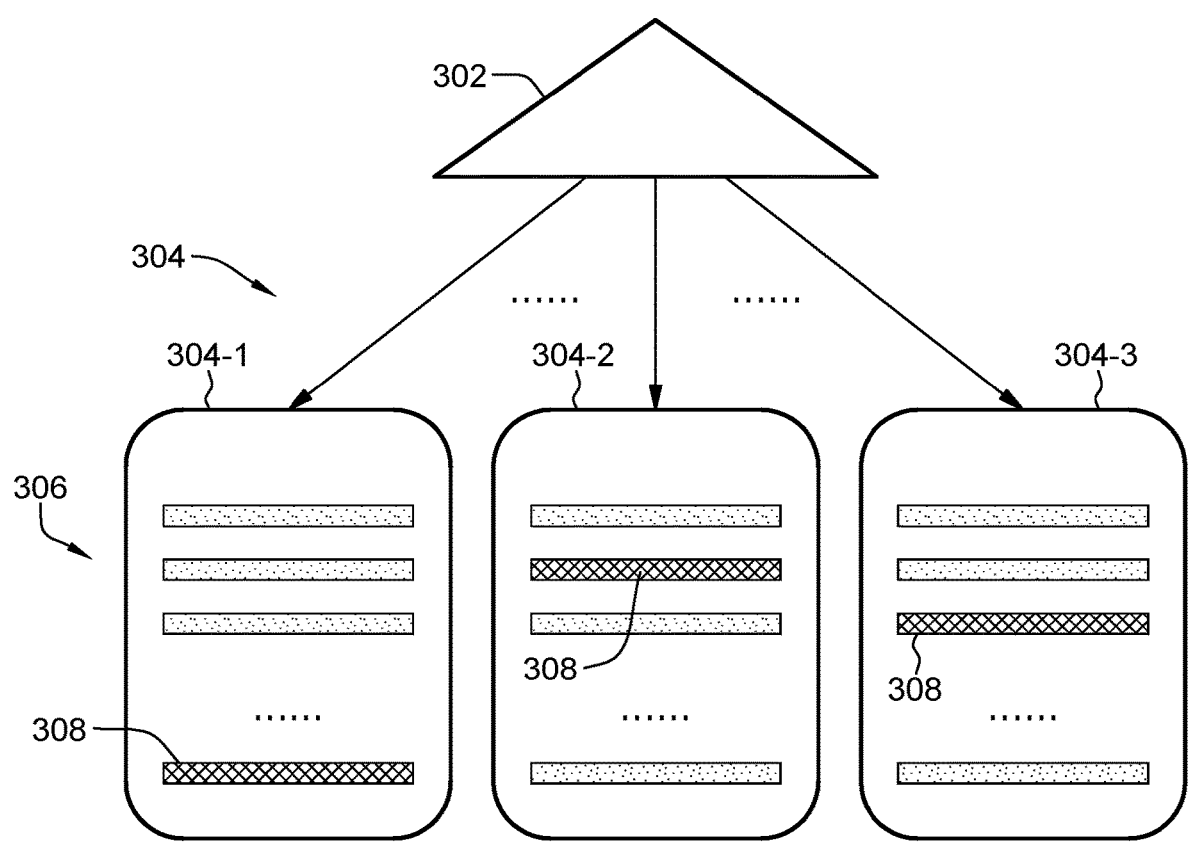
FIG. 3 depicts a schematic representation of table cardinality that may be present in the data source, in accordance with an embodiment of the present invention

FIG. 3 depicts a schematic representation of table cardinality that may be present in the data source 102, in accordance with an embodiment of the present invention. The performance simulation system 120 collects real-time system performance factors 122 by using base statistics from an index 302 and data pages 304 stored on the data source 102. As the database system 100 edits and updates the data source 102 between refreshes/data binding, the performance simulation system 120 continues to maintain accurate and actual system performance factors 122 by collecting delta statistics. That is, the performance simulation system 120 looks through the data pages 304 during table access in runtime, and determines which of the rows 306 qualify the predicate of the database query 104.

As an illustrative example, the database system 100 may receive a database query 104 that includes "A.C2=:H1 AND A.C3<=10." To calculate an accurate execution time for the database query 104, the performance simulation system 120 may collect real-time table cardinality and column cardinality. The performance simulation system 120 searches the data source 102 asynchronously (i.e., as a low priority search) without locking or latching the data source 102, and finds the index 302: A.C2=: H1. The performance simulation system 120 also collects the qualifying rows 308 that satisfy the predicate: A.C3<=10. The base statistics of the data source 102 may include a base statistic of 10,000 for this database query, and a delta statistic tracked by the performance simulation system 120 may include 8,000 for a total real-time table cardinality of 18,000.

The performance simulation system 120 also calculates the first execution time (i.e., still in block 202 of FIG. 3) by taking accurate filter factor information into account. That is, rather than merely relying on assumptions such as uniform data distribution, or inter-dependency of tables within the data source 102, the performance simulation system 120 retrieves and/or receives actual mathematical figures for the system performance factors relevant to the database query 104.

Once the system performance factors 122 are collected and/or retrieved, the performance simulation system 120 executes a simulation of the database query 104 using the real-time system performance factors, and calculates the first execution time for the database query through the first access path 108-1. This procedure may be calculated for each database query 104 that is sent to the database system 100.

The performance simulation system 120 also generates new access paths 108 (block 204) to see whether the first execution time can be improved upon. The new access paths 108 may be based on the system performance factors 122 retrieved in connection with calculating the first execution time, and may be generated first within the performance simulation system 120. In certain embodiments, after the performance simulation system 120 collects the real time statistics, the performance simulation system 120 may find there are multiple access paths for addressing the database query 104. The performance simulation system 120 generates additional access paths 108 based on the factor range of the input host variables of the database query 104 and the real-time statistics of the data source 102.

Figure 4:
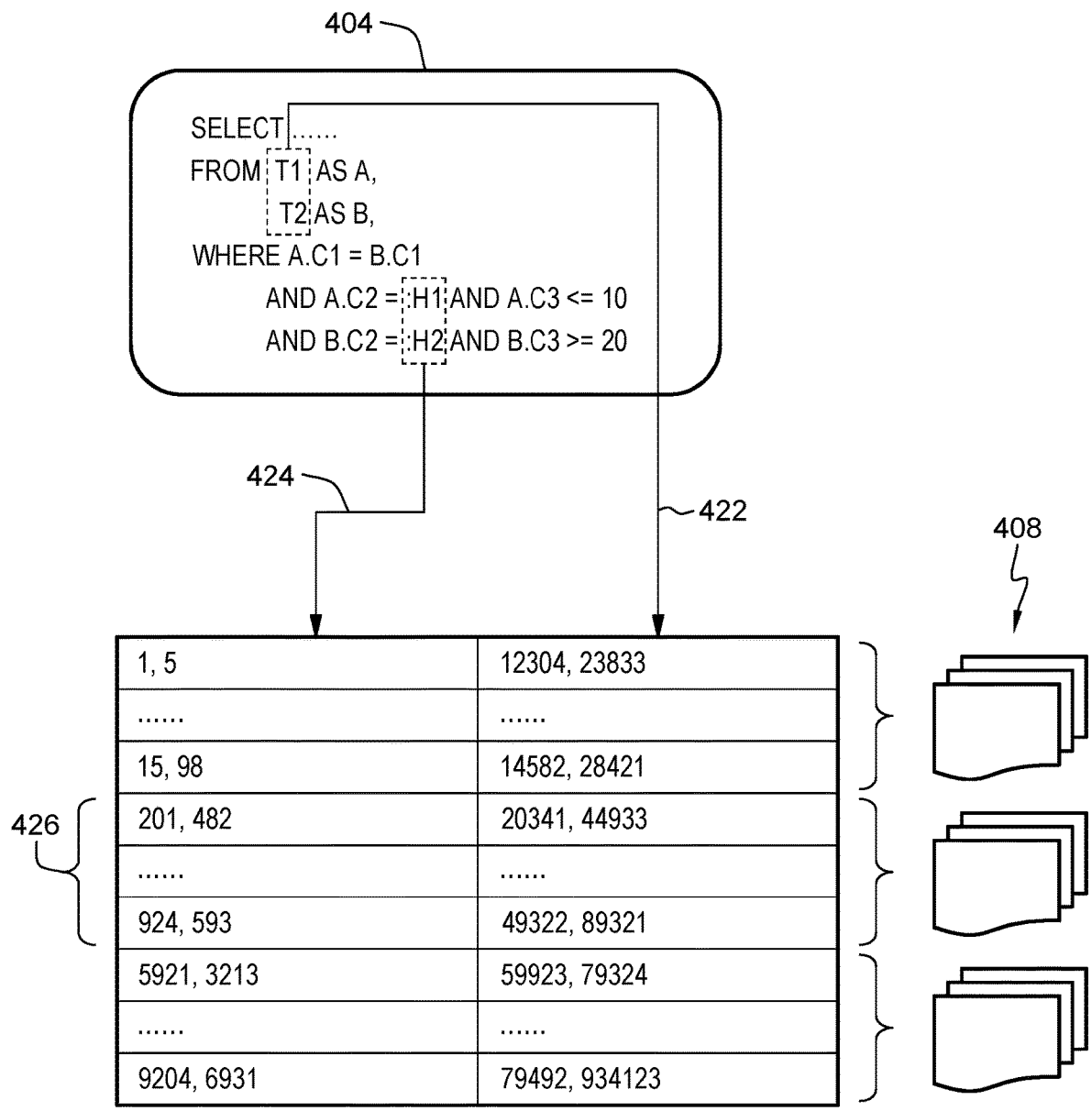
FIG. 4 depicts a representation of a database query from which the performance simulation system generates new access paths, in accordance with one embodiment of the present invention.
Figure 5:
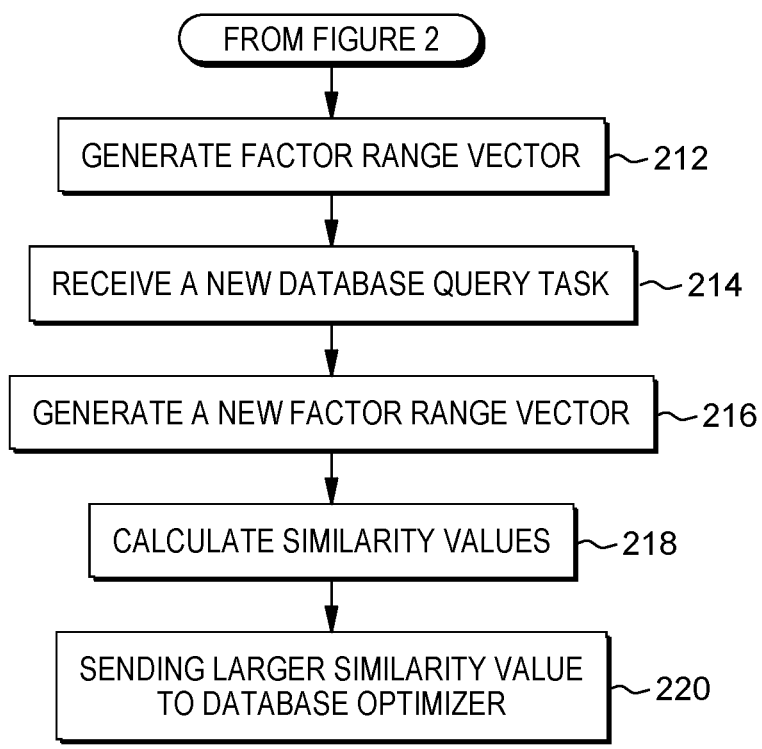

FIG. 4 depicts a representation of a database query 404 from which the performance simulation system 120 generates new access paths 408, in accordance with one embodiment of the present invention. The database query 404 includes system performance factors 422 (e.g., real-time table cardinality) and input host variables 424 that the performance simulation system 120 uses to generate the access paths 408. For example, the performance simulation system 120 may determine a factor range 426 that corresponds to each new access path 408.

The performance simulation system 120 may then determine a second execution time via a simulation of the database query through the second access path 108-2 (block 206). The performance simulation system 120 determines whether the second execution time is less than the first execution time (block 208). If not (block 208, "No") the performance simulation system 120 generates another access path 108 (returning to block 204) until all identified access path options have been associated with an execution time. If the performance simulation system 120 determines that the second execution time is less than the first execution time (block 208, "Yes"), then the performance simulation system 120 sends the second access path 108-2 to the optimizer 106 (block 210).

In the database query of FIG. 4 above, the base statistic of the predicate includes a table cardinality of 10,000. The first access path 108-1 includes a join sequence of T1→T2, since that was the access path generated during data binding. Based on this system performance factor 122 and the first access path 108-1, the performance simulation system 120 calculates (i.e., at block 202) the first execution time. Also as part of the initial step of calculating the first execution time, the performance simulation system 120 receives a delta cardinality of 8000. Based on the received change in delta cardinality, the performance simulation system 120 generates the second access path 108-2. That is, the second access path 108-2 may include an adjusted join sequence of T2→T1. The performance simulation system 120 calculates the second execution time, and determines that the second execution time is lower than the first execution time. Since the second execution time is lower than the first execution time, the performance simulation system 120 sends the second access path 108-2 to the optimizer 106, where it is available for subsequent database queries 104. The performance simulation system 120 may complete the method when the second access path 108-2 is sent to the optimizer 106, and the optimizer 106 may subsequently select between the first access path 108-1 and the second access path 108-2 for subsequent database queries.

In certain embodiments, the performance simulation system 120 may generate factor range vectors 130 based on the factor ranges (e.g., factor ranges 426 in FIG. 4) of each access path 108 to evaluate how additional database queries will match with the existing access paths 108 (block 212). For example, the performance simulation system 120 may calculate an average value for the factor range, and calculate a variance within each factor range. The performance simulation system 120 calculates a first factor range vector 130-1 for the first access path 108-1 and a second factor range vector 130-2 for the second access path 108-2. Additional factor range vectors 130 may be calculated for access paths 108 that are not sent to the optimizer 106. That is, upon receiving the database query 104, the performance simulation system 120 may generate many access paths 108 and only send one (or a subset) of the access paths 108. Factor range vectors 130 may be calculated for all of the access paths 108.

The performance simulation system 120 may then receive a new database query task from the database system 100 (block 214). Rather than immediately generating a new access path 108, the performance simulation system 120 may evaluate whether one of the access paths 108 already in the performance simulation system 120 may produce a fast execution time. The performance simulation system 120 generates a new factor range vector for the new database query task in a manner similar to how the factor range vectors 130 are generated for the access paths 108 (block 216). The performance simulation system 120 then calculates similarity values between the new factor range vector and the first factor range vector 130-1 and between the new factor range vector and the second factor range vector 130-2 (block 218). The similarity value may be calculated using a cosine similarity equation such as cos $$\theta = \frac{\sum_{1}^{n}(A_i * B_i)}{\left(\sqrt{\sum_{1}^{n}A_i^2} * \sqrt{\sum_{1}^{n}B_i^2}\right)}.$$

When the performance simulation system 120 calculates a larger similarity value, the factor range vectors are closer to each other, and the corresponding access path 108 will be more efficient. Therefore, the performance simulation system 120 sends the larger similarity value to the optimizer 106, and the optimizer 106 executes the new database query through the corresponding access path 108.

Figure 6:
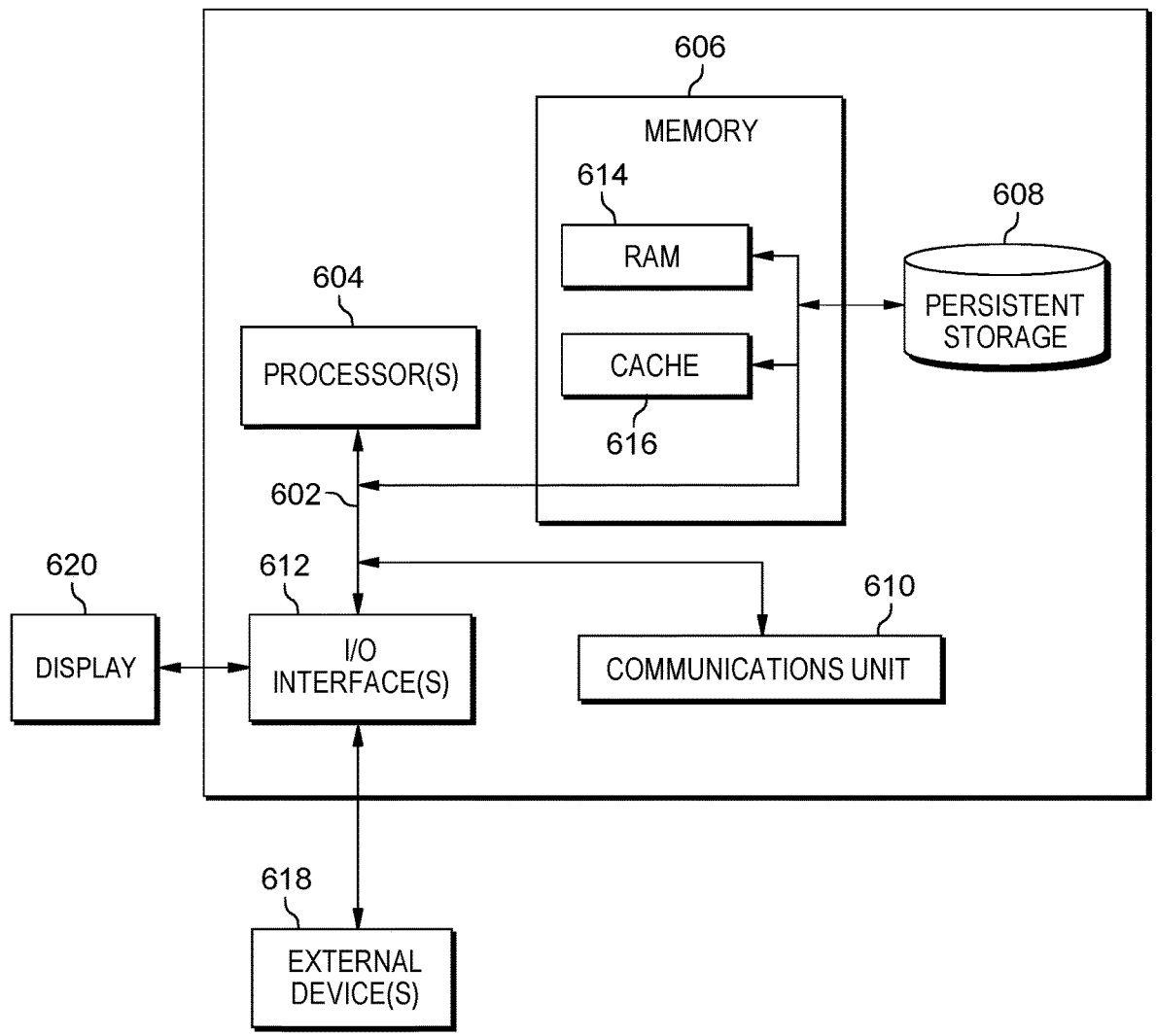
FIG. 6 is a block diagram of components of the database system, in accordance with an embodiment of the present invention.

FIG. 6 depicts a block diagram of components of the database system 100 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

The database system 100 includes communications fabric 602, which provides communications between RAM 614, cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

The performance simulation system 120 may be stored in persistent storage 608 and in memory 606 for execution and/or access by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 510 may provide communications through the use of either or both physical and wireless communications links. The performance simulation system 120 may be downloaded to persistent storage 608 through communications unit 610.

I/O interface(s) 612 allows for input and output of data with other devices that may be connected to server computer. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention (e.g., the performance simulation system 120) can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for improving performance of a database optimizer, comprising:
    calculating a first execution time for a database query executing through a first access path of a database system by accessing an index of the database system and database tables of the database system asynchronously to retrieve mathematical figures for real-time system performance factors relevant to the database query, wherein the real-time system performance factors comprise accessed real-time table cardinality and accessed real-time column cardinality, and the database query comprises a first factor range of input host variables and a first factor range vector;

generating a second access path and a second factor range vector based on a second factor range of the input host variables matched to the real-time system performance factors, wherein the second factor range vector comprises a real-time component updated based on the match with the real-time system performance factors;

simulating a second execution time for the database query executing through the second access path based on the second factor range vector and the real-time system performance factors;

determining that the second execution time is less than the first execution time;

responsive to determining that the second execution time is less than the first execution time, sending the second access path to the database optimizer;

receiving a new database query task;

generating a new factor range vector for the new database query task;

calculating a first similarity value between the new factor range vector and the first factor range vector to apply a cosine similarity equation to values represented as the new factor range vector and values represented as the first factor range vector;

calculating a second similarity value between the new factor range vector and the second factor range vector to apply the cosine similarity equation to the values represented as the new factor range vector and values represented as the second factor range vector; and sending a selection to the database optimizer, wherein the selection is a larger similarity value selected from the group consisting of: the first similarity value and the second similarity value.

2. The method of claim 1, wherein simulating the second access path comprises simulating access to the database query in the database system through a virtual resource.

3. The method of claim 1, wherein calculating the first execution time of the database query comprises computing a filter factor value by accessing real data in the database system.

4. The method of claim 1, wherein the real-time system performance factors comprise a selection from the group consisting of: a filter factor, a buffer pool hit ratio, and a prefetch efficiency.

5. The method of claim 1, wherein simulating the second execution time for the database query through the second access path comprises accessing the index of the database system and the database tables of the database system asynchronously.

6. The method of claim 1, wherein the database query comprises a Structured Query Language (SQL) query.

7. A computer program product comprising:

one or more computer readable storage media, and program instructions collectively stored on the one or more computer readable storage media, the program instructions comprising:

program instructions to calculate a first execution time for a database query executing through a first access path of a database system by accessing an index of the database system and database tables of the database system asynchronously to retrieve mathematical figures for real-time system performance factors relevant to the database query, wherein the real-time system performance factors comprise accessed real-time table cardinality and accessed real-time column cardinality, and the database query comprises a first factor range of input host variables and a first factor range vector;

program instructions to generate a second access path and a second factor range vector based a second factor range of the input host variables matched to the real-time system performance factors, wherein the second factor range vector comprises a real-time component updated based on the match with the real-time system performance factors;

program instructions to simulate a second execution time for the database query executing through the second access path based on the second factor range and the real-time system performance factors;

program instructions to determine that the second execution time is less than the first execution time;

program instructions to, responsive to determining that the second execution time is less than the first execution time, send the second access path to the database optimizer;

program instructions to receive a new database query task;

program instructions to generate a new factor range vector for the new database query task;

program instructions to calculate a first similarity value between the new factor range vector and the first factor range vector to apply a cosine similarity equation to values represented as the new factor range vector and values represented as the first factor range vector;

program instructions to calculate a second similarity value between the new factor range vector and the second factor range vector to apply the cosine similarity equation to the values represented as the new factor range vector and values represented as the second factor range vector; and program instructions to send a selection to the database optimizer, wherein the selection is a larger similarity value selected from the group consisting of: the first similarity value and the second similarity value.

8. The computer program product of claim 7, wherein generating the second access path comprises simulating access to the database query in the database system through a virtual resource.

9. The computer program product of claim 7, wherein calculating the first execution time of the database query comprises computing a filter factor value by accessing real data in the database system.

10. The computer program product of claim 7, wherein the real-time system performance factors comprise a selection from the group consisting of: a filter factor, a buffer pool hit ratio, and a prefetch efficiency.

11. The computer program product of claim 7, wherein simulating the second execution time for the database query through the second access path comprises accessing the index of the database system and the database tables of the database system asynchronously.

12. The computer program product of claim 7, wherein the database query comprises a Structured Query Language (SQL) query.

13. A computer system comprising:

one or more computer processors, one or more computer readable storage media, and program instructions collectively stored on the one or more computer readable storage media for execution by at least one of the one or more computer processors, the program instructions comprising:

program instructions to calculate a first execution time for a database query executing through a first access path of a database system by accessing an index of the database system and database tables of the database system asynchronously to retrieve mathematical figures for real-time system performance factors relevant to the database query, wherein the real-time system performance factors comprise accessed real-time table cardinality and accessed real-time column cardinality, and the database query comprises a first factor range of input host variables and a first factor range vector;

program instructions to generate a second access path and a second factor range vector based a second factor range of the input host variables matched to the real-time system performance factors, wherein the second factor range vector comprises a real-time component updated based on the match with the real-time system performance factors;

program instructions to simulate a second execution time for the database query executing through the second access path based on the second factor range and the real-time system performance factors;

program instructions to determine that the second execution time is less than the first execution time;

program instructions to, responsive to determining that the second execution time is less than the first execution time, send the second access path to the database optimizer;

program instructions to receive a new database query task;

program instructions to generate a new factor range vector for the new database query task;

program instructions to calculate a first similarity value between the new factor range vector and the first factor range vector to apply a cosine similarity equation to values represented as the new factor range vector and values represented as the first factor range vector;

program instructions to calculate a second similarity value between the new factor range vector and the second factor range vector to apply the cosine similarity equation to the values represented as the new factor range vector and values represented as the second factor range vector; and program instructions to send a selection to the database optimizer, wherein the selection is a larger similarity value selected from the group consisting of: the first similarity value and the second similarity value.

14. The computer system of claim 13, wherein simulating the second execution time for the database query through the second access path comprises accessing the index of the database system and the database tables of the database system asynchronously.

15. The computer system of claim 13, wherein calculating the first execution time of the database query comprises computing a filter factor value by accessing real data in the database system.

16. The computer system of claim 13, wherein the program instructions comprise: program instructions to collect system performance factors to determine features for the second access path, wherein the system performance factors comprise a selection from the group consisting of: a filter factor, a buffer pool hit ratio, and a prefetch efficiency.

* * * * *